United States Patent Office 3,535,858
Patented Oct. 27, 1970

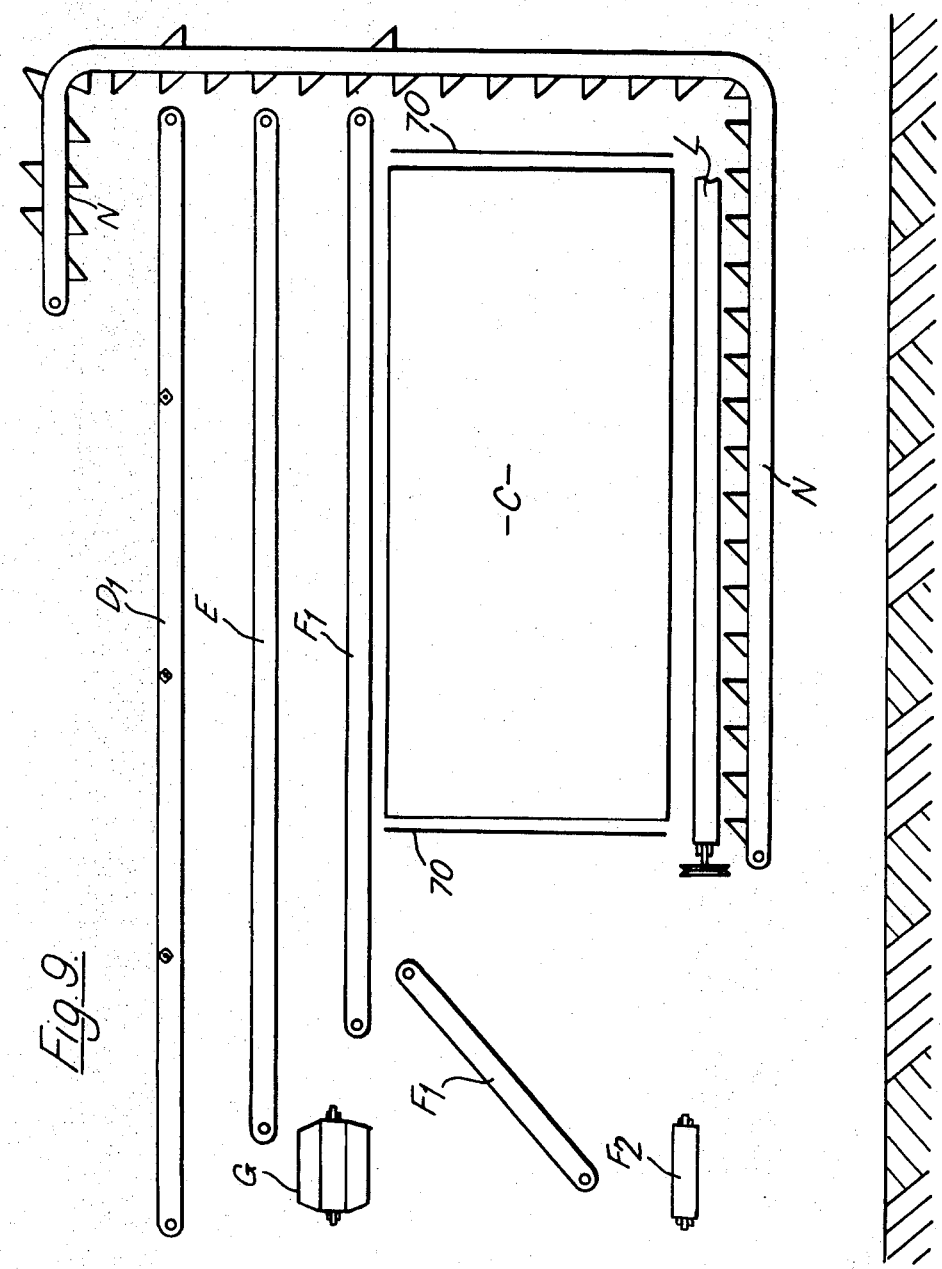

3,535,858
CROP PICKING MACHINES
Richard Laurence Catchpole, Bletchingley,
Staplehurst, England
Filed Dec. 26, 1967, Ser. No. 693,578
Claims priority, application Great Britain, Jan. 6, 1967,
962/67
Int. Cl. A01g 19/00
U.S. Cl. 56—19                                    8 Claims

ABSTRACT OF THE DISCLOSURE

A crop picking machine, e.g. for picking hops, comprises a very large diameter picking drum, equipped with picking fingers rotating relatively slowly within a shroud, partially surrounding the periphery of the drum and carrying internally further picking fingers, the periphery of the drum being greater than the normal length of the bines to be picked. The drum and shroud arrangement may be associated with hop sorting and cleaning apparatus, and may be mounted with its axis horizontal or vertical.

---

Figure 1:
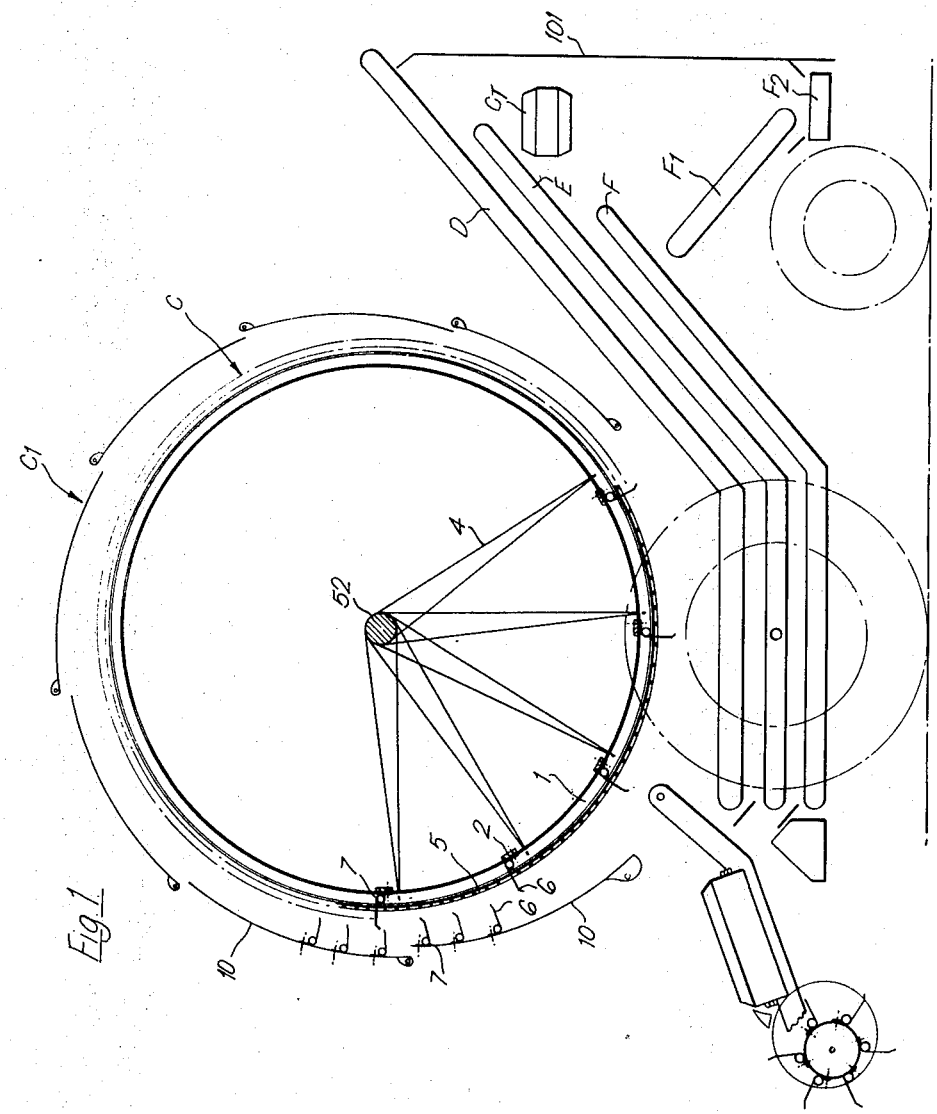

This invention relates to crop picking machines, intended primarily for picking hops.

In most known hop picking machines, the bines are cut and attached to a conveyor which carries them past a series of picking heads carrying fingers which strip the bines: these picking heads may comprise rotating drums carrying a number of picking fingers. An important disadvantage of such machines is that the bines have to be attached to the conveyor which is wasteful of labour and limits the operating speed of the machine. Moreover, in such a machine numbers of bine laterals and fragments of bines become detached and it is therefore common to provide an additional lateral picker in order to strip these.

Lateral pickers are known in which small drums (not exceeding about two feet in diameter) carrying a number of picking fingers are rotated at high speed (in many cases 400 r.p.m. or more) within a concave or shroud extending around the greater part of the periphery of the drum, the laterals being fed in the gap between the shroud and the drum. It is found however that unless the drums are rotated at very high speed, which results in much increased damage to the hops, or cutting knives are provided, which not only cut the laterals as intended but also complicate the construction and tend to damage the hops, the bine laterals wind themselves around the drum and rapidly disable it.

The above conveyor type bine picker, with its necessity for an additional lateral picker is not only extravagant of manpower, but very bulky, which entails either the provision of a stationary machine to which the bines must be brought for picking, or if the machine is to be mobile that its output be limited due to size limitations.

The object of the invention is to provide a machine for picking bines and or laterals which is economical in man power requirements, is capable of a high output relative to its size, and which minimizes damage to the hops.

Surprisingly, I have found that using a drum having picking fingers operating within a shroud having further picking fingers, the problem of bines wrapping round the drum can be overcome by increasing the size of the drum by a considerable extent whilst reducing its rotational and indeed its peripheral velocity. The decrease in peripheral velocity correspondingly decreases the danger of damage to the hops, whilst the increase in drum diameter enables whole bines to be picked as well as laterals provided that the normal length of the bines is less than the circumference of the drum. I find that the output of such a drum is very high compared to its size, whilst the bines and laterals, or laterals can be fed straight to the drum, either automatically or with the minimum of labour.

According to the invention, therefore, a machine primarily for picking hops comprises a relatively very large diameter picking drum peripherally equipped with picking fingers, drive means adapted to rotate said drum at a relatively low speed, a stationary shroud carrying internally further picking fingers, said shroud being spaced from and surrounding part of the periphery of the drum, and being adapted to guide the bines over the periphery of the drum for a distance which is a substantial part of their length whilst exerting a retarding drag thereon, the drum being of a sufficient diameter that the length of its periphery exceeds the normal length of hte bines to be picked. The terms "low" and "large" are used relative to the corresponding parameters of the picking drum used in the prior art lateral pickers described above. In practice, the drum diameter according to the invention may range from 4 feet upwards, whilst the speed of rotation is in any event very considerably lower than the 400 r.p.m. necessary in prior art lateral pickers without cutting knives, with a maximum of 200 r.p.m. for the smallest drums according to the invention and considerably lower speeds for larger drums. Preferably the peripheral velocity of the drum does not exceed 1,000 feet/minute particularly in the larger sizes. In practice, considerably lower peripheral speeds should prove satisfactory, the lowest speed consistent with efficient stripping being used in order to minimize damage to the hops.

Figure 2:
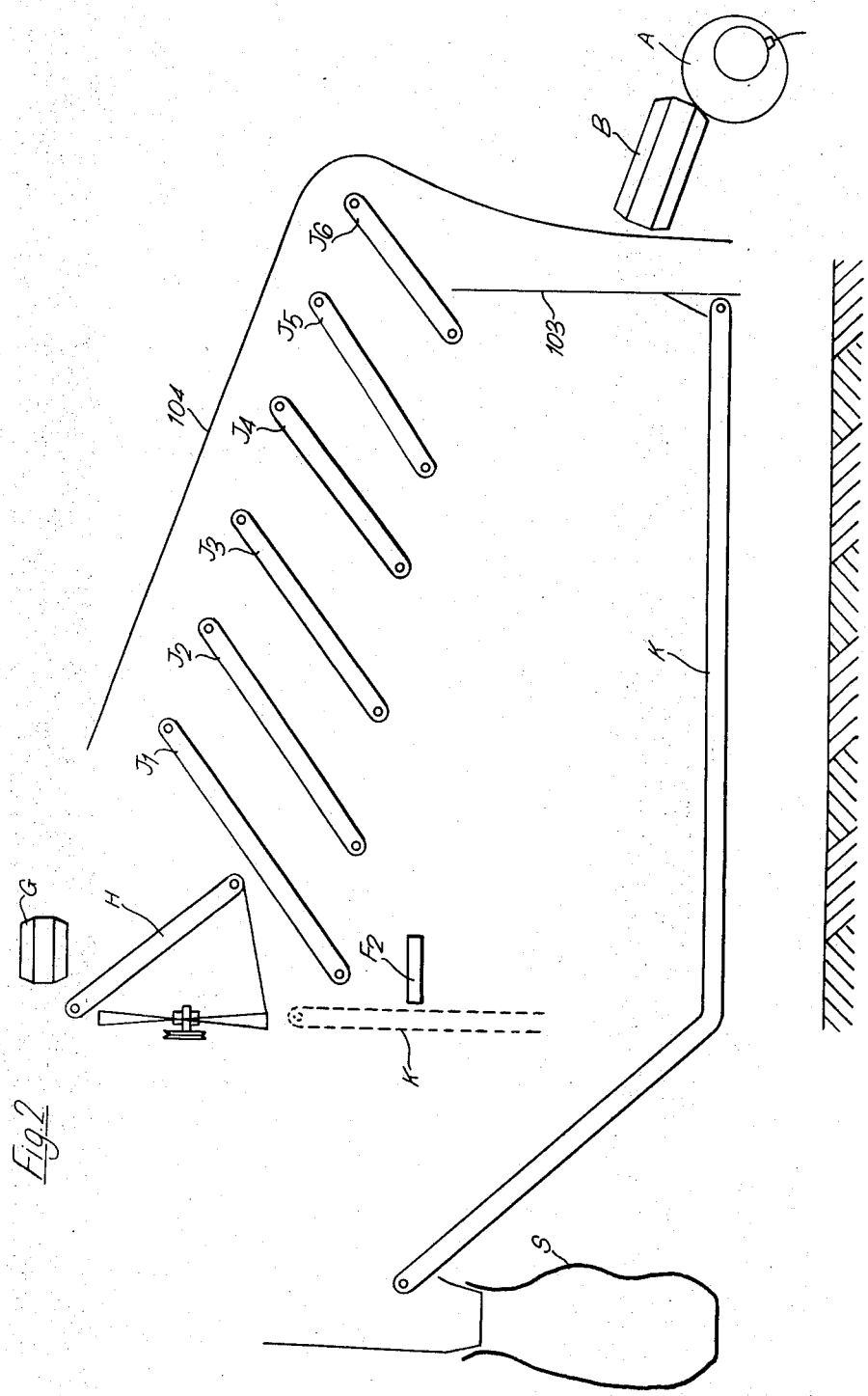
Figure 3:
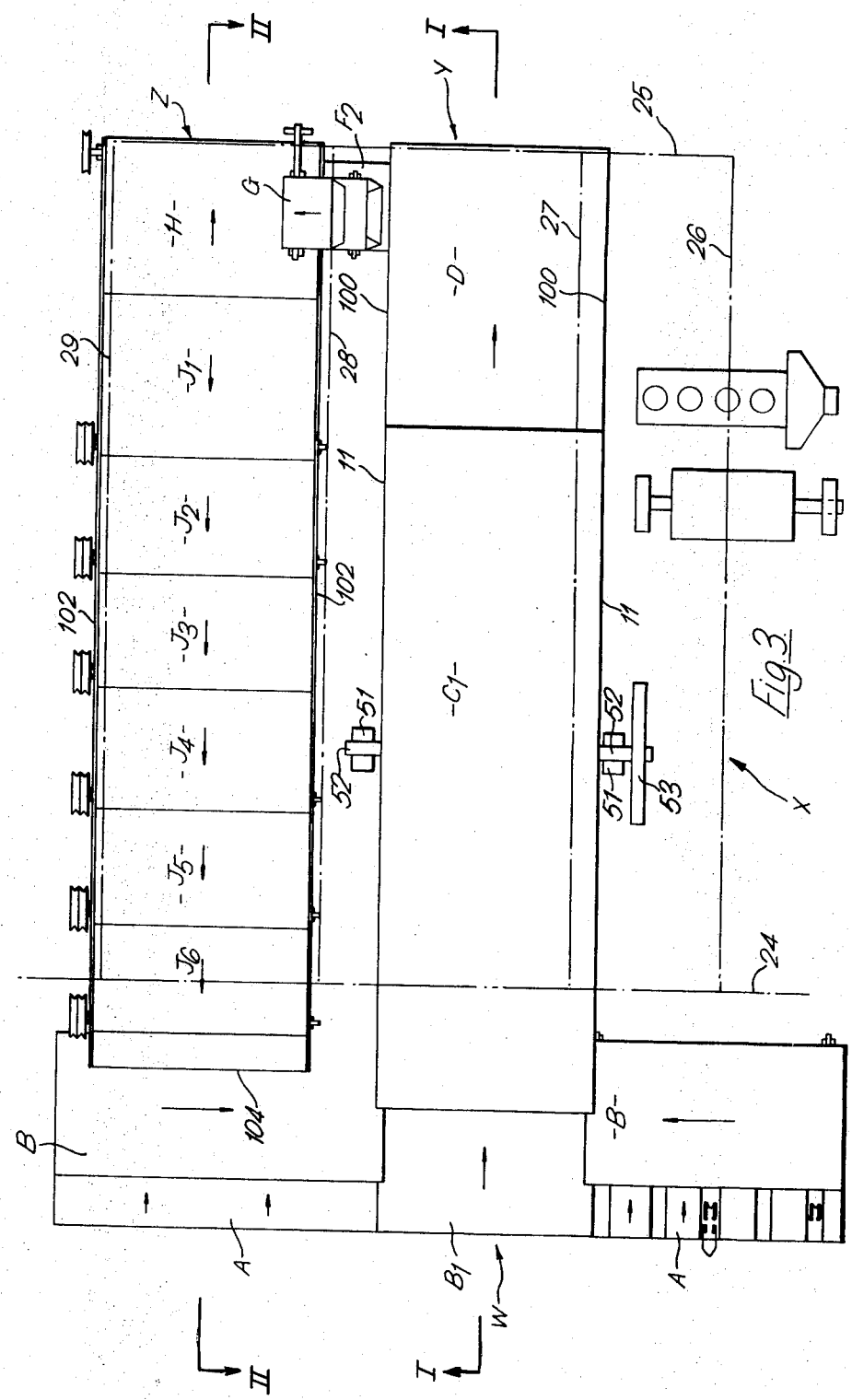
Figure 4:
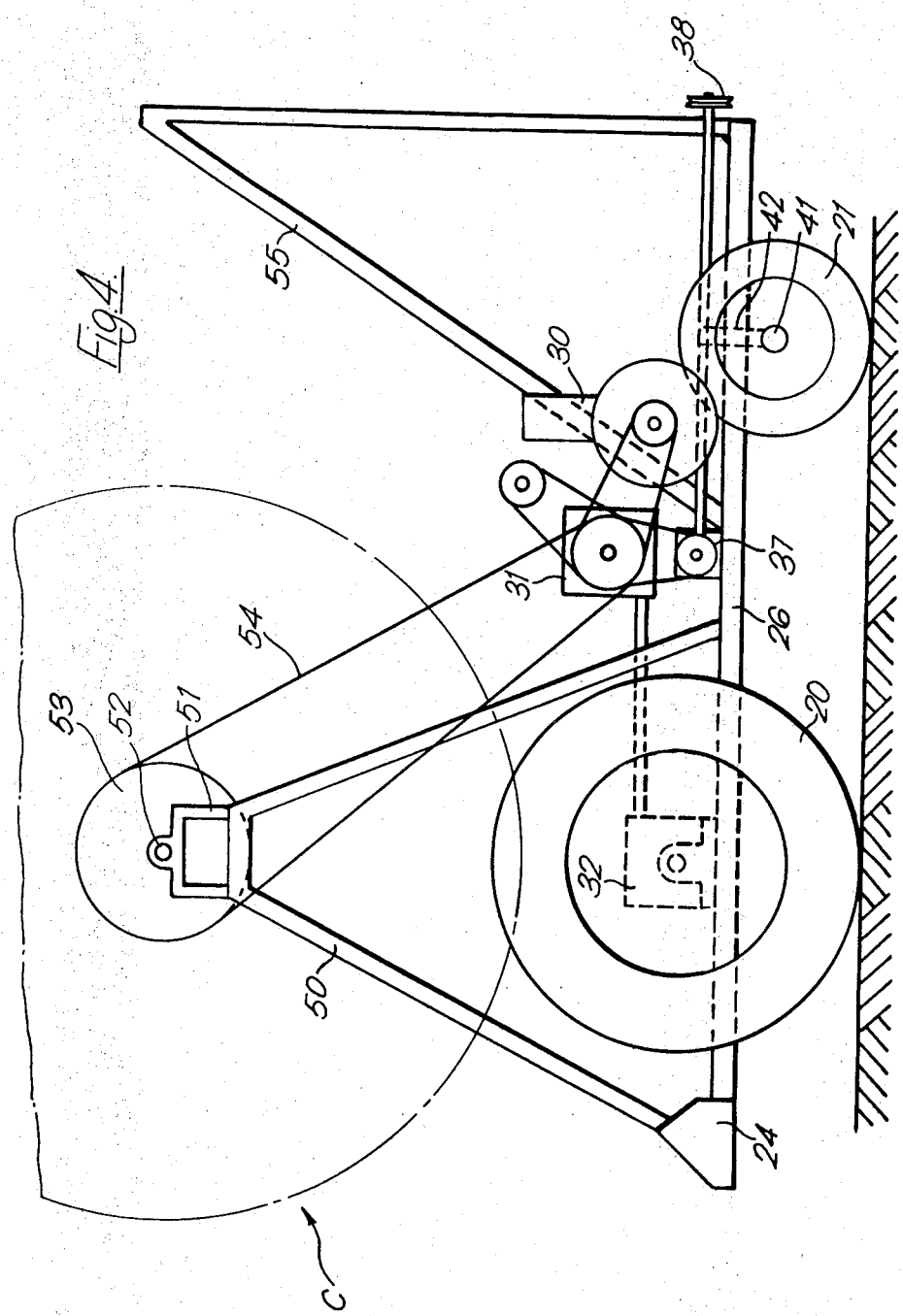
Figure 5:
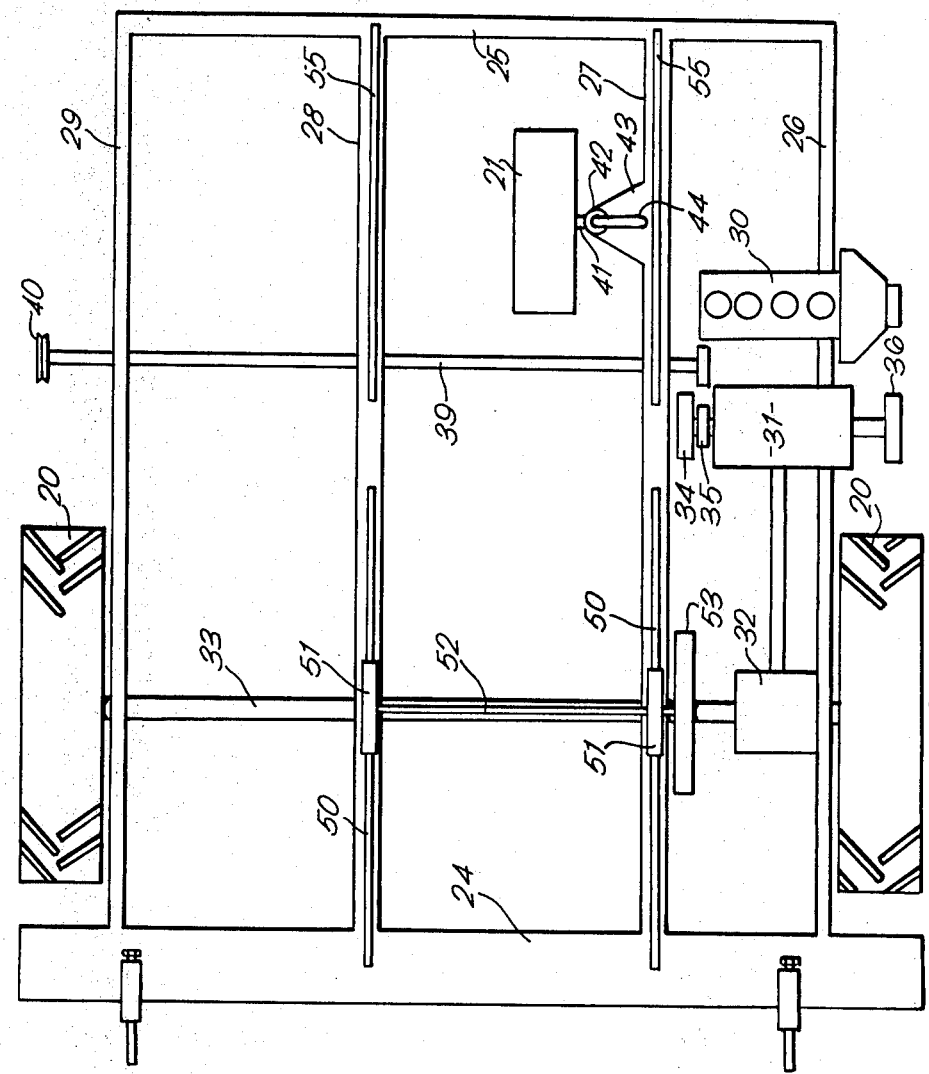
Figure 6:
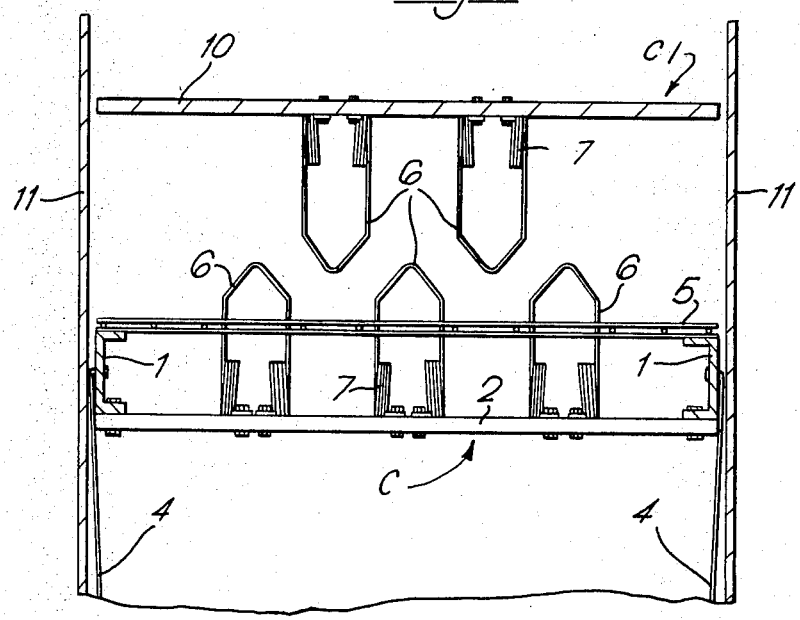
Figure 7:
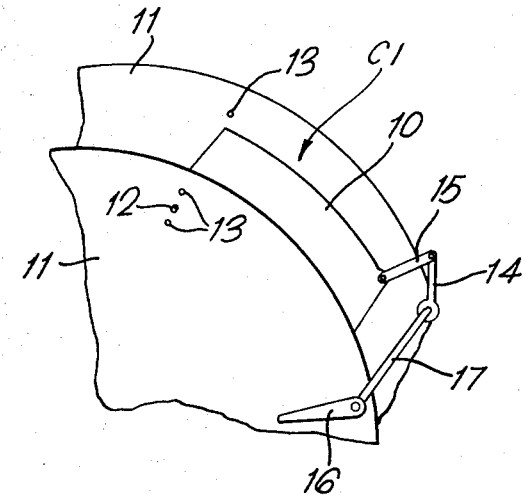
Figure 8:
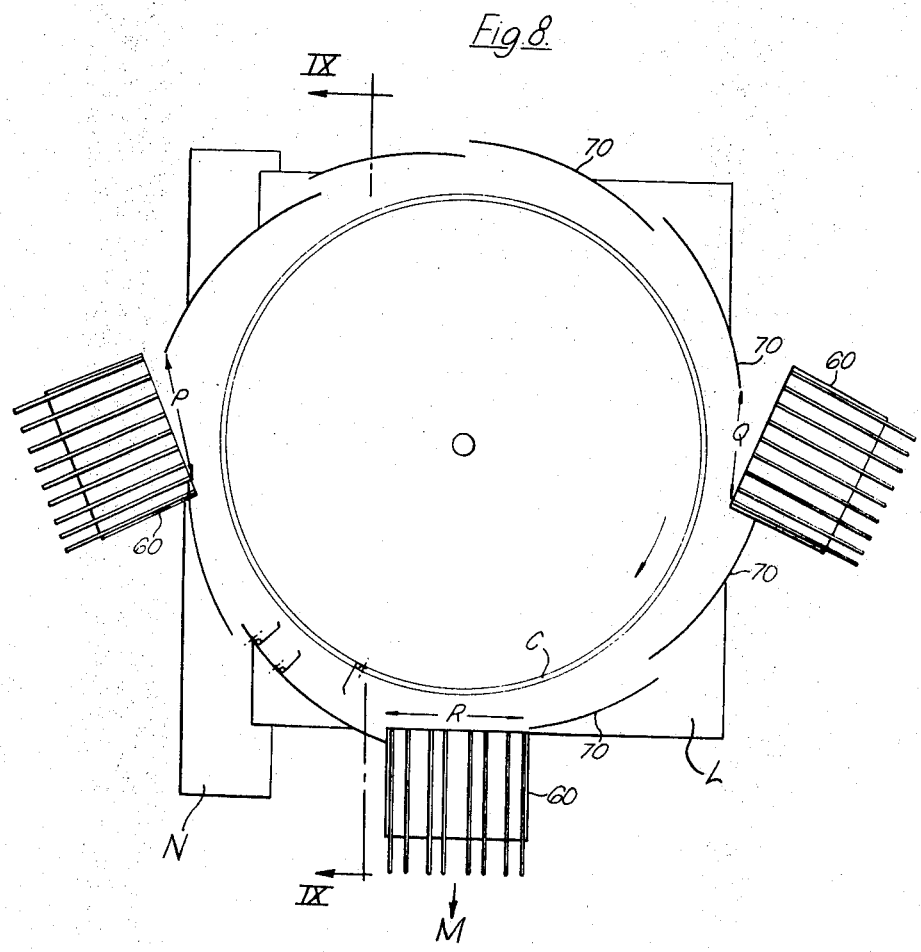

Two embodiments of the invention are described with reference to the accompanying diagrammatic drawings in which:

FIG. 1 is a vertical longitudinal section through a mobile hop picking machine, on the line I—I in FIG. 3, FIG. 2 is a vertical longitudinal section through the same machine on the line II—II in FIG. 3, FIG. 3 is a plan view of the machine, FIG. 4 is a side elevation of the frame of the machine showing the principle parts of the frame and drive of the machine, FIG. 5 is a plan view of the frame and drive, FIG. 6 is a part radial cross section of the picking drum, FIG. 7 is a perspective view of part of the shroud, FIG. 8 is a plan view of an alternative embodiment with the sorting and cleaning sections omitted for the sake of clarity, and FIG. 9 is a vertical section through this alternative embodiment on the line IX—IX in FIG. 8, showing parts of the cleaning and sorting sections.

Referring to FIGS. 1–5, the machine shown is a self propelled mobile machine intended for use in a hop garden. However a stationary machine could be designed on similar principles, the wheels and the drive thereto being omitted.

In use, the machine moves forward through a hop garden or yard on front wheels 20 and a steerable rear wheel 21 supported from a frame comprising front and rear end members 24 and 25, and longitudinal members 26, 27, 28, 29. The front wheels are driven by an engine 30 and a transmission comprising a gearbox 31 and a differential 32, and are supported from the frame members 26, 29 by an axle casing 33. The gearbox also has shafts carrying pulleys 34, 35, 36, one of which, pulley 36, transmits drive from the engine 30, and a further output shaft to a bevel box 37 whose output shaft in turn drives a further pulley 38. Pulley 35 is connected by a drive belt to cross shaft 39 driving yet a further pulley 40. Drive to all the various conveyors and rotating parts hereinafter described is derived by means of belt and pulley drives from one or other of these pulleys: such drives are familiar to the agricultural engineer and will not in general be further described. Moreover it will be appreciated that chain and sprocket or hydraulic drives could replace all or some of the belt and pulley drives.

The rear wheel is carried by a stub axle 41 supported by a steering pin 42 in a bracket 43 on frame member 27, steering movements being applied through a steering arm 44.

The front frame member 24 and frame members 27 and 28 respectively support a pair of A-frames 50 carrying bearings 51 in which the hub 52 of a picking drum C is supported. The drum is driven by a pulley 53 driven by a belt 54 from pulley 36. Further A-frames 55 are carried at the rear end of the frame and together with A-frames 50 and frame members 24–29 form the main framework from which the various parts of the machine are directly or indirectly supported.

Referring now to FIG. 3, it will be seen that the machine comprises four main sections which have been indicated by the letters W, X, Y and Z. It should be noted that the frame has been omitted in this figure, as in FIGS. 1 and 2, for the sake of clarity, except for dotted lines showing the positions of frame members 24–29.

Section W, which broadly comprises that part of the machine forward of front end member 24, comprises a pick up drum A such as is well known in connection with combine harvesters, cross feed conveyors B to the rear of the pick up drum, and a rearward conveyor $B_1$ receiving from conveyors B. As the machine moves forward, bines are cut and thrown down into the path of the machine onto drum A or conveyors B, $B_1$. The whole of section W is of more or less conventional construction and need not be described in detail.

Section X, which broadly comprises those parts of the machine lying between members 26 and 27, contains the principle components of the drive of the machine which have already been described above; the driver may also be accommodated here.

Section Y, which comprises those parts of the machine lying between members 27 and 28, is shown in section, together with section W, in FIG. 1, and forms the heart of the machine.

A picking drum (see also FIG. 6) indicated generally by the letter C comprises a pair of axially spaced rim members 1 spaced by struts 2 and supported from the hub 52 by spokes 4. The spoked construction is preferred because of its light weight, but alternative constructions could of course be used. Supported by the rim members 1 is a cylinder of wire mesh 5 having a mesh size sufficient to allow easy passage therethrough of the picked hops. Bolted to the struts 2 are a number of picking fingers 6 the free ends of which project through the mesh cylinder.

By placing the struts on the inside periphery of the rim members 1 and the mesh cylinder on their outside periphery, entanglement of the bines to be picked with the base of the picking fingers is avoided.

The fingers themselves each consist of a resilient wire loop, the ends of the loop being secured to a supporting member, in this case a strut 2. The resilience of the fingers is increased by forming integral coil springs 7 in the wire adjacent its ends. Other forms of fingers are known having alternative means of imparting resilience, and these may of course be utilized.

On reaching drum C, the bines are picked up by the fingers 6 on the drum and drawn into the gap between the drum C and a shroud $C_1$ which is arranged to exert a drag on the bines sufficient to ensure an effective picking action by the picking fingers mounted on the periphery of drum C and also by further picking fingers 6 mounted so as to project from the inner surface of the shroud $C_1$. The length of the periphery of drum C exceeds the normal maximum length of the bines to be picked, thus avoiding the possibility of bines becoming wound right round the drum C, whilst the length of the shroud is at least a substantial proportion of that of the bines.

The diameter of the drum will vary according to the length of the bines to be picked which may vary from 6 to as much as 25 feet according to local practice. In the United Kingdom, the length of bines is normally about 12 feet, whereas in other European countries and in the United States lengths of 18–20 feet are quite normal. Whilst a drum of 6 foot diameter would normally be adequate in the United Kingdom, an 8 or 9 foot diameter would be necessary in countries where bines are grown to a greater length.

In a simplified form of the machine consisting of only the components of section Y, and intended only for lateral picking in connection with a conventional hop picking machine, a drum diameter of less than 6 feet could be used, a diameter of 5 feet being preferred. With any diameter less than 4 feet however, the advantages of the invention over conventional lateral pickers begin to be lost.

The speed of rotation of the drum should be as low as possible consistent with efficient picking so as to minimize damage to the hops by keeping the peripheral speed damage to the hops by keeping the peripheral speed of the drum as low as possible. I have found using an 8 foot drum, that a peripheral speed of 800 feet/minute, corresponding to about 30 r.p.m., is satisfactory, but this can advantageously be reduced considerably, and it is anticipated that peripheral speeds as low as 200 feet per minute could be achieved. In any event peripheral speed should be kept below 1,000 ft./minute. With smaller drums, somewhat higher peripheral speeds may be necessary in order to obtain efficient picking using a single drum. The capacity of the machine will depend on the width of the drum, but with a mobile machine a drum width of 3 feet should be ample to handle bines as fast as they can be fed to the machine, whilst giving a very compact picking unit leaving plenty of room for the remaining parts of the machine to be accommodated alongside or beneath the drum within an overall width which could be as low as 9 feet or less.

The shroud $C_1$ surrounds a substantial part of the periphery of the drum C, its length being at least a substantial proportion of that of the bines, and is arranged so as to define a gap between itself and the drum which preferably progressively decreases in the direction of rotation of the latter. The additional picking fingers 6 associated with the shroud may be bolted directly to the inside surface of the shroud, but if difficulty arises due to entanglement of bines with the bases of the fingers 6, a construction similar to that of the drum periphery may be adopted using a mesh guard spaced from the shroud and overlying the bases of the fingers. It is found that the spacing of the fingers on the shroud should be closer than on the drum, the circumferential spacing being less by a ratio between 1:2 and 1:10.

Means are provided to adjust the distance between the shroud and the drum (see (FIG. 7). For this purpose, the shroud may be formed in segments 10 (only one is shown in FIG. 7) mounted between side plates 11 enclosing the drum. One end of each segment is pivoted on a pivot pin 12 seleectively engaged with one of a series of pairs of holes 13 in the side plates 11. The other end of each segment is pivotally supported from a lever arm 14 by a link 15, the position of the lever arm being determined by an adjusting arm 16, arms 14 and 16 being fast to a spindle 17 journalled in the side plates 11.

In use the shroud segments are adjusted so as to secure the most efficient picking action at the lowest possible speed of the drum; they also permit adjustment according to whether the bines are light or heavy.

Additionally, means may be provided for adjusting the projection of the fingers 6, for example by fitting mesh cylinders of differing diameter to the drum.

A conveyor D passes beneath the lower side of the drum where it emerges from the shroud C, the conveyor moving in the opposite direction to the periphery of the drum at a relatively high speed. The stripped bines emerging from the shroud are initially stripped from the drum by a combination of gravity and centrifugal force, the conveyor D assisting in the stripping process once the bines contact the latter. The bines carried by conveyor D are discharged to the rear of the machine, though this conveyor could if desired be arranged to discharge the bines to the side of the machine. Conveyor D is a mesh conveyor and onto it also falls all the material stripped from the bines. By using about a 2 inch mesh, the hops, small leaves and strig fall through the mesh onto conveyor E, whilst large leaf, and bine lateral are retained and are discharged with the bines.

Conveyor E comprises a fine mesh belt (for example ¾ inch mesh) which allows loose petal to fall through it to conveyor F which feeds it to an inclined conveyor $F_1$, where petal waste is removed, discharging onto a laterally moving conveyor $F_2$.

The hops, leaf and strig remaining on conveyor E are discharged onto a laterally moving conveyor G which transfers them sideways to cleaning apparatus (section Z) positioned alongside the drum C. The various conveyors in this section are shielded from the wind and from spillage by side plates 100 (FIG. 3) and a rear plate 101.

Section Z comprises that part of the machine lying between frame members 28 and 29, consisting of apparatus for cleaning the hops and petal delivered to it by conveyors G and $F_2$.

This cleaning apparatus is essentially of conventional construction except that the compact nature of the picking drum allows the apparatus to be located alongside the drum, and comprises a conveyor $G_1$ feeding the hops, leaves and strig to a cleaner elevator H comprising an inclined half inch mesh conveyor backed by an extractor fan which draws the leaf on the conveyor for discharge at the top of the conveyor onto the ground whilst allowing hops and strig to roll downwards onto the first of a series of elevators $J_1$ to $J_6$. On these elevators the strig tends to be carried to the top to a discharge point whilst the hops tend to roll downwards onto a conveyor K which deposits them into a bin or bag L together with the petal from conveyor $F_2$.

The conveyor K may be hinged for movement between a position in which it discharges into a sack S as shown, and a position shown in broken lines in which it is inoperative and forms the base of a bulk container formed by the lower part of side plates 102 enclosing conveyors H, $J_1$–$J_6$ and K, and an end plate 103. Hops are discharged from this container by starting conveyor K. Conveyors $J_1$–$J_6$ are further enclosed by a top plate 104 which cooperates with plate 103 to form a discharge chute for separated waste.

The machine can be so constructed that the sections W, Y and Z are modular units which can if necessary be changed individually. This gives greater versatility to the machine which whilst designed for picking hops can advantageously be used for picking other crops with suitable modification if necessary. This is a considerable advantage since it enables the machine to be used at times other than the short hop picking season.

For example, brussels sprouts require the distance between the drum and the shroud to be reduced, and also the effective length of the fingers should be shorter, this being achieved either by using smaller fingers or by mounting them further back relative the mesh cylinder of the drum or the inner surface of the shroud. Furthermore, whereas the mesh size of the cylinder should be about 2 inches for hops, a somewhat larger size may be found more suitable for sprouts. Since the stems of the plants are relatively stiff and short and winding round the drum is not therefore a problem, it might be thought a smaller drum could be used but the large drum has the advantage that an adequate picking action can be achieved with only the single drum whereas otherwise several drums in series might be necessary. It may also be necessary to exchange section W of the machine for an elevator and cross conveyor assembly including a cutter bar.

Referring now to FIGS. 8 and 9, there is shown an alternative embodiment of the invention in which the picking drum C, which is of similar construction to that described with reference to the first embodiment is arranged with its axis vertical. This enables a machine to be provided in which the bines can be stripped without being severed from the hill.

The segments 70 of the shroud $C_1$ are however arranged in three groups so as to leave three separate gaps P, Q, R around the drum at the leading end of each group, one to each side and one towards the front of the machine. A rotating pick up drum 60 is provided adjacent each gap P, Q, R and so dimensioned and oriented that as the machine moves forward (see arrow M) on a wheeled chassis similar to that described with reference to FIGS. 4 and 5 save for such modifications as are necessitated by the reorientation of the drum C, the pick ups 60 will pick up bines from three adjacent rows and feed them to the drum 60, whereupon the rotation of the latter will draw them beneath the shroud $C_1$ except for the last few feet at the base of each bine which remains rooted to the ground and in any event does not bear hops. As the machine moves forward the bines will again be dragged out of the space between the shroud and the drum C through the gaps by which they entered as a result the forward motion of the machine, and are thus left attached to the hill when the machine has passed.

It will be appreciated that with a drum for example 8 feet in diameter provided in a machine dimensioned to pick bines grown in rows 6½ feet apart, there will probably be some overlap between bines from different rows around the circumference of the drum. To reduce any risk of tangling, the pick ups may be arranged to feed bines to the drum C at different levels, so as to provide a separate picking zone of about 1 foot for each row if a 3 foot wide drum is used. Axial separators may be provided between the zones if necessary.

Beneath the drum is provided a broad laterally travelling conveyor belt L discharging onto an elevator conveyor N which carries the hops, leaf and strig to the front of the machine and then up to above the level of the drum whence it discharges onto a mesh conveyor $D_1$ corresponding in large leaf and strig separating function to conveyor D in the first embodiment. The matter passing through this conveyor is then treated on conveyors E, F, $F_1$ and G, corresponding to the similarly indexed parts in the first embodiment. Conveyors $F_1$ and G discharge to a cleaning apparatus (not shown) similar to that described with reference to the first embodiment and broadly there referred to as section Z. The only difference in the separating and cleaning apparatus is that this apparatus is situated above the drum rather than beneath and alongside it.

What I claim is:

1. A hop picking machine for picking hops from hop bines, said machine comprising: a picking drum at least four feet in diameter and having a peripheral length exceeding the normal length of the bines from which hops are to be picked, said drum being peripherally equipped wtih picking fingers, a frame in which said picking drum is mounted for rotation, a stationary shroud supported from said frame and surrounding a part of the periphery of said drum in spaced relation thereto a distance which is at least a substantial part of said normal length of said bines and carrying internally further picking fingers, thereby defining a path between the shroud and the drum for bines to be picked, and drive means operatively connected to and rotating said drum at a peripheral velocity of less than 1000 feet per minute.

2. A machine according to claim 1, wherein the distance between the shroud and the drum decreases in the direction of motion of the drum.

3. A machine according to claim 1, including means for adjusting the distance between the shroud and the drum.

4. A machine according to claim 3, wherein the shroud is formed in a number of individually adjustable sections.

5. A machine according to claim 1, wherein the drum comprises a framework supporting a mesh cylinder having a mesh size sufficient to allow easy passage of hops stripped from the bines, said picking fingers mounted on said framework and projecting through the mesh cylinder.

6. A machine according to claim 1, wherein said frame comprises a wheeled chassis, said machine further comprising apparatus for sorting and cleaning the material stripped by the drum from the bines, vines or stems, the major part of the apparatus being arranged on said chassis alongside the drum, the latter being supported by the frame in a fore and aft vertical plane with its axis horizontal.

7. A machine according to claim 4, wherein the axis of the drum is vertical, and the shroud is formed in a number of separate groups of sections peripherally spaced to permit the feeding of stems, bines or vines to the drum at the leading end, relative to the direction of motion of the drum, of each group.

8. A machine according to claim 7, wherein the frame comprises a wheeled chassis movable forwardly through a hop garden, and comprising means mounted on said frame adjacent the leading end of each group of sections for feeding bines, still attached to the hill, from separate rows parallel to the direction of motion of the machine to the leading end of each group of sections, whereby the stripped bines are withdrawn from the machine, as a result of the forward movement thereof through the leading ends to which they were fed.

References Cited

UNITED STATES PATENTS

| 1,262,760 | 4/1918 | Elliott | 56—19 |
| 2,974,467 | 3/1961 | Long | 56—19 |
| 3,381,455 | 5/1968 | Mitchell | 56—19 |

FOREIGN PATENTS

| 273,117 | 5/1964 | Australia. |

LOUIS G. MANCENE, Primary Examiner

J. A. OLIFF, Assistant Examiner